United States Patent Office 3,293,278
Patented Dec. 20, 1966

3,293,278
DERIVATIVES OF DIPHENETHYLBENZENE
Ferdinand B. Zienty, Warson Woods, and Myron J. Holm, St. Louis, Mo., assignors to Monsanto Company, St. Louis, Mo., a corporation of Delaware
No Drawing. Filed June 5, 1964, Ser. No. 373,065
1 Claim. (Cl. 260—465)

The present application is a continuation-in-part of our copending application Serial Number 170,807, filed February 2, 1962, and now abandoned.

This invention relates to new chemical compounds and particularly to derivatives of diphenethylbenzene.

The compounds to which the present invention is specifically directed are tetracyanodiphenethylbenzene and certain derivatives thereof. These derivatives include diphenethylbenzene tetracarboxylic acids together with their esters, anhydrides, imides, carboxamides and mixed ester-carboxamides. These compounds which exhibit utility as synthetic resin intermediates are characterized by the following structural formula:

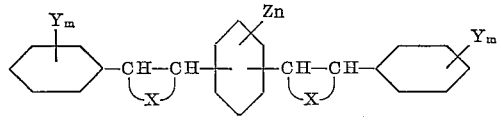

wherein X is a divalent moiety selected from the group consisting of (a) 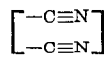

(b) 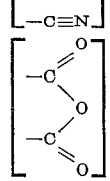

(c) 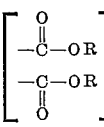

(d) 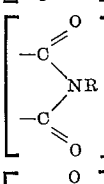

(e) 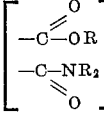

and (f) 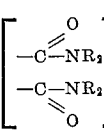

with R being selected from the group consisting of hydrogen, alkyl, alkenyl, cycloalkyl, aryl and aralkyl radicals containing from 1 to 18 carbon atoms,
Y is a monovalent substituent selected from the group consisting of alkyl, aryl and aryloxy radicals, alkoxy radicals containing from 1 to 18 carbon atoms, nitro radicals, halogens and secondary and tertiary amino radicals,
Z is a monovalent substituent selected from the group consisting of methyl radicals and halogens,
$m$ is a cardinal number from 0 to 5 inclusive, and
$n$ is a cardinal number from 0 to 4 inclusive.

The term "divalent moiety" as used herein designates an entity consisting of one or two organic radicals having a total valence of 2. When only one radical constitutes the moiety, the radical is divalent. Likewise, when two radicals co-operate to make up the moiety, both radicals are monovalent. In either event, the two valences of the moiety are provided by single unsatisfied valence bonds on two separate carbon atoms.

Tetracyanodiphenethylbenzene, the parent compound of the present group, can be prepared by the condensation of a benzenediacetonitrile with a benzaldehyde to form dibenzylidenebenzenediacetonitrile and by cyanation of the dibenzylidenebenzene diacetonitrile. The condensation and cyanation can be conducted in a one-step operation, or the introduction of the additional nitrile groups can be deferred until the condensation is complete. The tetracyanodiphenethylbenzene thus obtained can be partially hydrolyzed to the corresponding tetracarboxamide or diimide, or more fully hydrolyzed to the tetracarboxylic acid of diphenethylbenzene. The acid may be esterified or its anhydride ammoniated to provide the related esters, amides or imides.

As indicated above, benzaldehyde can be used in the preparation of the present invention. However, in the preparation of compounds having substituents on the terminal benzene rings, it is preferred to use substituted benzaldehydes rather than to add the substituents after the condensation reaction. Specific examples of substituted benzaldehydes that can be employed include methylbenzaldehydes, ethylbenzaldehydes, propylbenzaldehydes, butylbenzaldehydes, decylbenzaldehydes, dodecylbenzaldehydes, octylbenzaldehydes, methoxybenzaldehydes, ethoxybenzaldehydes, propoxybenzaldehydes, butoxybenzaldehydes, nonoxybenzaldehydes, undecoxybenzaldehydes, octadecoxybenzaldehydes, phenylbenzaldehydes, tolylbenzaldehydes, phenoxylbenzaldehydes, toloxybenzaldehydes, nitrobenzaldehydes, chlorobenzaldehydes, fluorobenzaldehydes, bromobenzaldehydes, iodobenzaldehydes, nitrohalobenzaldehydes, alkylhalobenzaldehydes, alkohalobenzaldehydes, aroxyhalobenzaldehydes, alkylnitrobenzaldehydes, alkylnitrohalobenzaldehydes and the like. The substituents on the benzaldehyde nucleus can vary in number from one through five, be like or unlike, and members of the groups indicated hereinbefore.

The benzenediacetonitrile to be condensed with the benzaldehyde may be ortho, meta or para, substituted or unsubstituted. Suitable benzenediacetonitrile include mono-, di-, tri-, and tetra-methylbenzenediacetonitriles, mono-, di-, tri-, and tetra-chlorobenzenediacetonitriles, mono-, di-, tri- and tetra-fluorobenzenediacetonitriles, mono-, di-, tri- and tetra-bromobenzenediacetonitriles, and mono-, di-, tri- and tetra-iodobenzenediacetonitriles. Mixed halobenzenediacetonitriles and methylhalobenzenediacetonitriles may also be employed. Examples of suitable benzenediacetronitriles of these groups include chlorofluoro-, chlorobromo-, chloroiodo-, fluorobromo-, fluoroiodo-, bromochloro-, bromoiodo-, chlorobromoiodo-, methylchloro-, methylfluoro-, methyliodo-, methylbromo-benzenediacetonitriles and the like.

As indicated above, R in the foregoing formulae can be hydrogen or a hydrocarbon group containing from one to eighteen carbon atoms. Representative alkyl groups include methyl, ethyl, propyl, butyl, pentyl, hexyl, heptyl, oxtyl, nonyl, decyl, hendecyl, dodecyl, tridecyl, tetradecyl, pentadecyl, hexadecyl, heptadecyl, octadecyl and the like. Suitable alkenyl groups include, for example, binyl, alkyl, propenyl, butenyl, pentenyl, hexenyl, heptenyl, octenyl, nonenyl, decenyl, hendecenyl, dodecenyl, tridecenyl, tetradecenyl, pentadecenyl, hexadecenyl, heptadecenyl, octadecenyl and the like. Alkenyl groups containing more than one double bond are also suitable. Cycloalkyl groups represented by R include cyclopropyl, cyclobutyl, cyclopentyl, cyclohexyl, cycloheptyl, cyclooctyl and the like. The cycloalkyl groups can have one or more hydrocarbon side chains to provide substituted cycloalkyl groups containing as many as eighteen carbon atoms. Aryl groups represented by R include phenyl, tolyl, xylyl, ethylphenyl, propylphenyl, butylphenyl, pentylphenyl, hexylphenyl, heptylphenyl, octylphenyl, nonylphenyl, decylphenyl, hendecylphenyl, dodecylphenyl and the like. Thus, the aryl groups can have one or more alkyl substituents containing a maximum of twelve carbon atoms. Representative monocyclic aralkyl or alphyl groups designated by R include benzyl, phenylethyl, phenylpropyl, phenylbutyl, phenylpentyl, phenylhexyl, phenylheptyl, phenyloctyl, phenylnonyl, phenyldecyl, phenylhendecyl, phenyldodecyl, xylylethyl and the like. While it is preferred that all of the above hydrocarbon groups are unsubstituted, they can have nitro groups or halogens. Also, the hydrocarbon chains can be either straight or branched.

The invention will be further clarified by reference to the following detailed descriptions of the preparations of compounds encompassed thereby. Unless otherwise specified, all proportions in these examples and throughout the specification are expressed in parts by weight.

EXAMPLE 1

$\alpha,\alpha',\beta,\beta'$-Tetracyano-p-diphenethylbenzene

This example describes the preparation of the above compound by the condensation of benzaldehyde with p-benzenediacetonitrile followed by cyanation with sodium cyanide of the condensation product, $\alpha,\alpha'$-dibenzylidine-p-benzenediacetonitrile.

In a 1-liter beaker equipped with a vigorous stirrer there were placed about 53 g. of redistilled benzaldehyde, about 39 g. of p-benzenediacetonitrile, and 325 ml. of 95% ethanol. The mixture was warmed to dissolve the reactants, then allowed to cool to 45° C. Sodium ethoxide was prepared by adding 1.2 g. of sodium to 25 ml. of ethanol, and this alkali solution was added dropwise to the stirred reaction mixture. After 7 ml. of the alkali had been added, a precipitate formed rapidly which transformed the reaction mixture to a thick paste. Stirring and the addition of alkali were stopped, the mixture was cooled to room temperature, and the precipitate was collected by filtration. After washing with a mixture of 100 ml. of water and 300 ml. of ethanol and recrystallizing from acetonitrile (1 g. in 280 ml.), the product was obtained in the form of pale yellow platelets, which changed to bright yellow on warming, and melted at 255–256° C. Upon further recrystallization, no change in melting point was encountered. Infrared spectrum was consistent with the assigned structure.

*Analysis.*—Calcd. for $C_{24}H_{16}N_2$ (332.38): C, 86.72; H, 4.85; N, 8.43. Found: C, 87.06; H, 4.94; N, 8.56.

A 3-liter flask was equipped with a stirrer, a reflux condenser, and a dropping funnel. In the flask were placed 1 liter of triethylamine, 1 liter of methanol, and 33.2 g. of $\alpha,\alpha'$-dibenzylidene-p-benzenediacetonitrile prepared in accordance with the above process. A solution of 24.5 g. of sodium cyanide in 40 ml. of warm water was then added rapidly to the stirred, boiling nitrile suspension, followed by a solution of 11.5 ml. of acetic acid in 90 ml. of methanol to hold the color to a pale red hue. (In the absence of added acetic acid, the mixture approaches a deep fuchsia.) After 1.5 hours an additional 5 ml. of acetic acid was added, and the very pale pink solid was filtered from the hot liquors, washed twice with 200 ml. portions of methanol and twice with 200 ml. portions of water. A sample recrystallized from a mixture of 150 ml. of acetic acid and 200 ml. of dimethylformamide yielded a crystalline solid melting at a temperature above 300° C. For analysis, a sample of crude product was washed with hot acetonitrile and hot water. The infrared spectrum was consistent with the assigned structure.

*Analysis.*—Calcd. for $C_{26}H_{18}N_4$ (386.44): C, 80.80; H, 4.70; N, 14.50. Found: C, 80.23; H, 5.06; N, 14.73.

In substantially the same manner, other $\alpha,\alpha',\beta,\beta'$-tetracyanodiphenethylbenzenes (I) are prepared by using an equivalent amount of each of the following benzaldehydes (II) and benzenediacetonitriles (III).

EXAMPLE 2

(I) $\alpha,\alpha',\beta,\beta'$-Tetracyano-o-diphenethylbenzene
(II) Benzaldehyde
(III) o-Benzenediacetonitrile

EXAMPLE 3

(I) $\alpha,\alpha',\beta,\beta'$-Tetracyano-m-diphenethylbenzene
(II) Benzaldehyde
(III) m-Benzenediacetonitrile

EXAMPLE 4

(I) 4,4''-dimethyl-$\alpha,\alpha',\beta,\beta'$-tetracyano-p-diphenethylbenzene
(II) 4-methylbenzaldehyde
(III) p-Benzenediacetonitrile

EXAMPLE 5

(I) 2,2''-dimethyl-$\alpha,\alpha',\beta,\beta'$-tetracyano-p-diphenethylbenzene
(II) 2-methylbenzaldehyde
(III) p-Benzenediacetonitrile

EXAMPLE 6

(I) 3,3''-dimethyl-$\alpha,\alpha',\beta,\beta'$-tetracyano-p-diphenethylbenzene
(II) 3-methylbenzaldehyde
(III) p-Benzenediacetonitrile

EXAMPLE 7

(I) 4,4''-dioctadecyl-$\alpha,\alpha',\beta,\beta'$-tetracyano-p-diphenethylbenzene
(II) 4-octadecylbenzaldehyde
(III) p-Benzenediacetonitrile

EXAMPLE 8

(I) 4,4''-dimethoxy-$\alpha,\alpha',\beta,\beta'$-tetracyano-p-diphenethylbenzene
(II) 4-methoxybenzaldehyde
(III) p-Benzenediacetonitrile

EXAMPLE 9

(I) 2,2''-dimethoxy-$\alpha,\alpha',\beta,\beta'$-tetracyano-p-diphenethylbenzene
(II) 2-methoxybenzaldehyde
(III) p-Benzenediacetonitrile

EXAMPLE 10

(I) 3,3''-dimethoxy-$\alpha,\alpha',\beta,\beta'$-tetracyano-p-diphenethylbenzene
(II) 3-methoxybenzaldehyde
(III) p-Benzenediacetonitrile

EXAMPLE 11

(I) 4,4''-dioctadecoxy-$\alpha,\alpha',\beta,\beta'$-tetracyano-p-diphenethylbenzene
(II) 4-octadecoxybenzaldehyde
(III) p-Benzenediacetonitrile

EXAMPLE 12

(I) 4,4''-diphenyl-$\alpha,\alpha',\beta,\beta'$-tetracyano-p-diphenethylbenzene
(II) 4-phenylbenzaldehyde
(III) p-Benzenediacetonitrile

EXAMPLE 13

(I) 4,4″-diphenoxy-α,α′,β,β′-tetracyano-p-diphenethylbenzene
(II) 4-phenoxybenzaldehyde
(III) p-Benzenediacetonitrile

EXAMPLE 14

(I) 3,3″-dinitro-α,α′,β,β′-tetracyano-p-diphenethylbenzene
(II) m-Nitrobenzaldehyde
(III) p-Benzenediacetonitrile

EXAMPLE 15

(I) 3,3″-dichloro-α,α′,β,β′-tetracyano-p-diphenethylbenzene
(II) m-Chlorobenzaldehyde
(III) p-Benzenediacetonitrile

EXAMPLE 16

(I) 2′-methyl-α,α′,β,β′-tetracyano-p-diphenethylbenzene
(II) Benzaldehyde
(III) 2-methyl-p-benzenediacetonitrile

EXAMPLE 17

(I) 2′-chloro-α,α′,β,β′-tetracyano-p-diphenethylbenzene
(II) Benzaldehyde
(III) 2-chloro-p-benzenediacetonitrile

EXAMPLE 18

(I) 2′,3′,5′,6′-tetrachloro-α,α′,β,β′-tetracyano-p-diphenethylbenzene
(II) Benzaldehyde
(III) 2,3,5,6-tetrachlorobenzene-1,4-diacetonitrile

EXAMPLE 19

(I) 3,4,3″,4″-tetramethoxy-α,α′,β,β′-tetracyano-p-diphenethylbenzene
(II) Veratraldehyde (3,4-dimethoxybenzaldehyde)
(III) p-Benzenediacetonitrile

EXAMPLE 20

(I) 2′-nitro-α,α′,β,β′-tetracyano-p-diphenethylbenzene
(II) Benzaldehyde
(III) 2-nitro-p-benzenediacetonitrile

EXAMPLE 21

(I) 3,3″-dinitro-4,4″-dimehtyl-α,α′,β,β′-tetracyano-m-diphenethylbenzene
(II) 3-nitro-4-methylbenzaldehyde
(III) m-Benzenediacetonitrile

EXAMPLE 22

(I) 3,3′,3″-trinitro-α,α′,β,β′-tetracyano-p-diphenethylbenzene
(II) m-Nitrobenzaldehyde
(III) 2-nitro-p-benzenediacetonitrile

EXAMPLE 23

*p-Diphenethylbenzene-α,α′,β,β′-tetracarboxylic acid*

To a mixture of about 50 g. of α,α′,β,β′-tetracyano-p-diphenethylbenzene prepared in accordance with Example 1, and 112.5 ml. of water were added 956 ml. of concentrated sulfuric acid. By swirling and warming to 80–90° C. the nitrile was dissolved. The solution was allowed to stand at room temperature for 3 hours and then it was diluted with about 540 ml. of water. This mixture was held at 120° for 8 hours, and then allowed to cool. The solid which separated was collected, washed, and dissolved in dilute ammonium hydroxide. This dark solution was decolorized by passing through a column of decolorizing carbon. The pale yellow percolate was heated and stirred with 10 ml. of acetic acid. Then 40 ml. of concentrated hydrochloric acid was added. The white precipitate which formed was collected, washed thoroughly with water, and dried. This material melted well over 300° C.

*Analysis.*—Calcd. for $C_{26}H_{22}O_8$ (462.44): C, 67.53; H, 4.80; neut. eq. 115.61. Found: C, 65.74; 65.88; H, 5.23, 5.00; neut. eq. 124.

Evaporation of the mother liquors allowed recovery of an additional 0.4 g. of tan solid with the same neutral equivalent.

Similarly, other diphenethylbenzene tetracarboxylic acids can be prepared by the hydrolysis of tetracyanodiphenethylbenzenes having the desired substituents on one or more of their benzene rings. Suitable tetracyanodiphenethylbenzenes that can be thus hydrolyzed include, for instance, those obtained in accordance with Examples 2 through 19. It is self-evident that the various substituted tetracarboxylic acids thus obtained can be utilized in the preparation of the corresponding esters, anhydrides, imides, carboxamides and mixed ester-carboxamides. Thus, in the interests of clarity and brevity, the remaining illustrative examples are directed to such compounds that are derived from the acid of Example 23.

EXAMPLE 24

*Tetramethyl p-diphenethylbenzene-α,α′,β,β′-tetracarboxylate*

To a suspension of 41.8 g. of p-diphenethylbenzene-α,α′,β,β′-tetracarboxylic acid in 1 liter of methanol there was added 100 ml. of sulfuric acid. The mixture was heated for 12 hours, cooled, and the precipitate was collected, washed with methanol, then water, and dried. The product was gray-white and melted at temperatures above 250° C. The infrared spectrum was consistent with the assigned structure.

*Analysis.*—Calcd. for $C_{30}H_{30}O_8$ (518.54): C, 69.48; H, 5.83. Found: C, 68.5; H, 6.08.

EXAMPLE 25

*Tetraoctyl p-diphenethylbenzene-α,α′,β,β′-tetracarboxylate*

A 10 g. sample of the tetracarboxylic acid made in accordance with Example 13 was mixed with 100 ml. of octyl alcohol and 10 ml. of concentrated sulfuric acid and the stirred suspension was heated for 7 hours at 100°, then 5 hours at 110°. The solid which had failed to dissolve (starting material) was removed by filtration, washed and dried.

Ethyl acetate and water were added to the filtrate, and the mixture was neutralized by the addition of alkali. The organic phase was separated, washed and steam distilled. After removal of the excess alcohol, the organic phase was diluted with ethyl acetate, dried, and allowed to crystallize. After collection, the precipitate was washed with an ethyl acetate-isooctane mixture and dried. The infrared spectrum was consistent with the assigned structure.

*Analysis.*—Calcd. for $C_{58}H_{86}O_8$ tetraester (911.27): C, 76.44; H, 9.51; saponification equivalent, saponification equivalent, 227.82. Found: C, 76.23; H, 9.13; saponification equivalent 225.5.

The higher tetraalkyl tetracarboxylates of diphenethylbenzenes are preferably prepared by the esterification of the tetra acid. However, they may also be synthesized by transesterification of a lower tetra alkyl tetracarboxylate, such as the methyl of Example 24, or by direct alcoholysis of the corresponding tetranitrile, such as the α,α,′β,β′-tetracyano-p-diphenethylbenzene of Example 1.

EXAMPLE 26

*Tetracyclopentyl p-diphenethylbenzeneα,α′β,β′-tetracarboxylate*

The procedure of Example 25 is followed using cyclopentanol in place of octyl alcohol.

EXAMPLE 27

*Tetra(dimethylcyclohexyl) p-diphenethylbenzene-α,α′,β,β′-tetracarboxylate*

The procedure of Example 25 is followed using dimethylcyclohexanol in place of octyl alcohol.

EXAMPLE 28

*Tetra (β-cyclohexylethyl) p-diphenethylbenzene-α,α'-β,β'-tetracarboxylate*

The procedure of Example 25 is followed using β-cyclohexylethanol in place of octyl alcohol.

EXAMPLE 29

*Tetra (β-phenethyl) p-diphenethylbenzene-α,α',β,β'-tetracarboxylate*

The procedure of Example 25 is followed using β-phenethyl alcohol in place of octyl alcohol.

EXAMPLE 30

*p-Diphenethylbenzene-α,α',β,β'-tetracarbonyl chloride*

About 10 grams of the tetracarboxylic acid made in accordance with Example 13 is heated in a suitable reaction vessel with about 100 ml. of thionyl chloride until the evolution of sulfur dioxide and hydrogen chloride has ceased. Then the excess thionyl chloride is removed by distillation and the tetra-acid chloride remains.

EXAMPLE 31

*Tetraphenyl p-diphenethylbenzene-α,α',β,β'-tetracarboxylate*

About 10 grams of the tetra-acid chloride prepared in accordance with Example 30 is treated with about 50 grams of phenol and the mixture heated at approximately 80° until the evolution of hydrogen chloride has ceased. Removal of the excess phenol by distillation under reduced pressure yields the tetraphenyl ester.

EXAMPLE 32

*p-Diphenethylbenzene-α,α'-β,β'-tetracarboxylic acid dianhydride*

Approximately 20 grams of the p-diphenethylbenzene-α,α',β,β'-tetracarboxylic acid prepared in accordance with Example 23 and 200 grams of acetic anhydride are introduced into a suitable reaction vessel provide with heating and stirring means and a condenser. This mixture is heated while agitating to a temperature of approximately 130° C., and maintained at this temperature for about 8 hours to insure completion of the reaction. Since the system is kept above the boiling point of acetic acid, this reaction by-product is removed as soon as formed. This eliminates any tendency of the reaction to reverse itself. Also the completion of the reaction is clearly indicated by the termination of acetic acid distillation. Upon completion of the reaction, the resultant dianhydride is removed from the acetic anhydride and washed with ligroin.

EXAMPLE 33

*N,N'-dicyclohexyl-p-diphenethylbenzene-α,α',β,β'-tetracarboxylic acid diamide*

About 10 grams of the dianhydride prepared in accordance with Example 32 is dissolved in 200 ml. of acetonitrile in a suitable reaction vessel equipped with a stirrer. Then two equivalents of cyclohexylamine are added slowly. The volatile materials are removed by distillation under reduced pressure leaving the diacid-diamide.

EXAMPLE 34

*p-Diphenethylbenzene-α,α',β,β'-tetracarboxylic acid, dimethyl ester*

About 10 grams of the dianhydride prepared in accordance with Example 32 is added to about 100 ml. of methanol and the mixture is stirred and heated at reflux for several minutes. Then the excess methanol is removed by distillation leaving the diacid-diester.

EXAMPLE 35

*p-Diphenethylbenzene-α,α',β,β'-tetracarboxylic acid diimide*

A mixture of about 40 grams of α,α',β,β'-tetracyano-p-diphenethybenzene of Example 1 and about 100 grams of p-toluenesulfonic acid monohydrate is prepared in a 500 ml. flask provided with an agitator. With continuous agitation the mixture is heated to and maintained at a temperature of about 120° C. for approximately 1 hour. After cooling the diimide thus prepared is separated from the unreacted p-toluenesulfonic acid monohydrate by leaching with water, then collected by filtration and purified by recrystallization from ethanol. The product is a high melting white crystalline material having an infrared spectrum consistent with the assigned structure.

EXAMPLE 36

*N,N'-dimethyl-p-diphenethylbenzene-α,α',β,β'-tetracarboxylic acid diimide*

About 10 grams of the dianhydride prepared in accordance with Example 32 is dissolved in about 200 ml. of acetonitrile in a suitable reaction vessel equipped with a stirrer. Then two equivalents of methylamine are added. The volatile materials are removed by distillation under reduced pressure leaving the diacid-diamide which is converted to the diimide by refluxing with about 100 ml. of acetic anhydride. Removal of the acetic anhydride by distillation leaves the diimide.

EXAMPLE 37

*N,N'-di-n-butyl-p-diphenethylbenzene-α,α'β,β'-tetracarboxylic acid diimide*

This product is made by the method of Example 36 using n-butylamine in place of methylamine.

EXAMPLE 38

*N,N'-di-n-dodecyl-p-diphenethylbenzene-α,α'β,β'-tetracarboxylic acid diimide*

This product is made by the procedure of Example 36 using n-dodecylamine in place of methylamine.

EXAMPLE 39

*N,N'-dicyclohexyl-p-diphenethylbenzene-α,α'β,β'-tetracarboxylic acid diimide*

This product is made in accordance with the procedure of Example 36 using cyclohexylamine in place of methylamine.

EXAMPLE 40

*N,N'-dibenzyl-p-diphenethylbenzene-α,α'β,β'-tetracarboxylic acid diimide*

This product is made in accordance with the procedure of Example 36 using benzylamine in place of methylamine.

EXAMPLE 41

*N,N'-di(p-tolyl)-p-diphenethylbenzene-α,α'β,β'-tetracarboxylic acid diimide*

This product is made in accordance with the procedure of Example 36 using p-toluidine in place of methylamine.

EXAMPLE 42

*p-Diphenethylbenzene-α,α',β,β'-tetracarboxamide*

About 25 grams of α,α',β,β'-tetracyano-p-diphenethylbenzene is dissolved in 500 ml. of 90% sulfuric acid at about 90° C. The mixture is stirred gently until solution is complete and then allowed to stand for approximately 3 hours. The solution is then drowned in an excess (about 5 liters) of water at room temperature to precipitate the p-diphenethylbenzene-α,α',β,β'-tetracarboxamide. The precipitated product is collected by filtration and washed free of acid with additional water.

EXAMPLE 43

*N,N,N',N'-tetramethyl-p-diphenethylbenzene-α,α',β,β'-tetracarboxamide*

About 10 grams of the tetraacid chloride made in accordance with Example 30 is fed into an agitated solution of eight equivalents of methylamine in benzene. When all the acid chloride has been added, the solvent is removed by distillation and the product washed with water to remove amine hydrochloride and dried under reduced pressure.

EXAMPLE 44

*N,N,N',N'-octamethyl-p-diphenethylbenzene-a,a',β,β'-tetracarboxamide*

This product is made in accordance with the procedure of Example 43 using dimethylamine in place of methylamine.

EXAMPLE 45

*N,N,N',N'-tetra(2-ethylhexyl)-p-diphenethylbenzene-a,a',β,β'-tetracarboxamide*

This product is made in accordance with the procedure or Example 43 using 2-ethylhexylamine in place of methylamine.

EXAMPLE 46

*N,N,N',N'-tetracyclohexyl-p-diphenethylbenzene-a,a',β,β'-tetracarboxamide*

This product is made in accordance with the procedure of Example 43 using cyclohexylamine in place of methylamine.

EXAMPLE 47

*N,N,N',N'-tetrabenzyl-p-diphenethylbenzene-a,a',β,β'-tetracarboxamide*

This product is made in accordance with the procedure of Example 43 using benzylamine in place of methylamine.

EXAMPLE 48

*N,N,N',N'-tetraxylyl-p-diphenethylbenzene-a,a',β,β'-tetracarboxamide*

This product is made in accordance with the procedure of Example 43 using xylidine in place of methylamine.

EXAMPLE 49

*p-Diphenethylbenzene-α,α',β,β'-tetracarboxylic di-methyl ester diamide*

Approximately 10 g. of (p-diphenethylbenzene-α,α',β,β'-tetracarboxylic acid) dianhydride of Example 32 is dissolved in 200 ml. of acetonitrile in a suitable vessel provided with means for vigorous agitation and with an inlet for subsurface introduction of a gas. Ammonia is then passed into the stirred mixture for 4 hours. Then all of the volatile materials are removed by distillation under reduced pressure. The residue is dissolved in approximately 500 ml. of water and 20 ml. of 5 N hydrochloric acid is added. A precipitate of the diacid-diamide forms. It is collected by filtration and redissolved in a solution of 2 g. of sodium hydroxide in 100 ml. of water. While this solution is vigorously stirred at room temperature, 5.5 g. of dimethyl sulfate is added. Stirring is continued and after one-half hour, an additional 1 g. of sodium hydroxide, followed by 2.7 g. of dimethyl sulfate is added. Following a second one-half hour's stirring, the mixture is buffered by the addition of 5 g. of sodium bicarbonate, and then warmed to 60° C. for 15 minutes. The separated p-diphenethylbenzene-α,α',β,β'-tetracarboxylic di-methylester diaminde is collected, washed with 100 ml. of a 1% solution of sodium bicarbonate, then 100 ml. of water. The product thus obtained is a white solid having a melting point above 300° C.

EXAMPLE 50

*p-Diphenethylbenzene-α,α',β,β'-tetracarboxylic acid, dimethyl ester, N,N'-dimethylamide*

About 10 grams of the dianhydride of Example 32 is dissolved in about 200 ml. of acetonitrile in a suitable reactor equipped with an agitator. Then two equivalents of methylamine are added and the volatile materials are removed by distillation under reduced pressure. The residue of diacid-diamide is dissolved in an agitated solution of 3 grams of sodium hydroxide in water, and about 8 grams of dimethyl sulfate is fed in slowly. The insoluble product, the diester-diamide, is separated and dried.

EXAMPLE 51

*p-Diphenethylbenzene-α,α',β,β'-tetracarboxylic acid, dimethyl ester, N,N'-di-n-butylamide*

This product is made in accordance with the procedure of Example 50 using n-butylamine in place of methylamine.

EXAMPLE 52

*p-Diphenethylbenzene-α,α',β,β'-tetracarboxylic acid, diethyl ester, N,N'-dioctylamide*

This product is made in accordance with the procedures of Example 50 using octylamine in place of methylamine. and diethyl sulfate in place of dimethyl sulfate.

EXAMPLE 53

*p-Diphenethylbenzene-α,α',β,β'-tetracarboxylic acid, dimethyl ester, N,N,N',N'-tetra-n-butylamide*

This product is made in accordance with the procedure of Example 50 using di-n-butylamine in place of methylamine.

EXAMPLE 54

*p-Diphenethylbenzene-α,α',β,β'-tetracarboxylic acid, diethyl ester, N,N'-dicyclohexylamide*

This product is made in accordance with the procedure of Example 50 using cyclohexylamine in place of methylamine and diethyl sulfate in place of dimethyl sulfate.

EXAMPLE 55

*p-Diphenethylbenzene-α,α',β,β'-tetracarboxylic acid, dimethyl ester, N,N'-dicycloheptylamide*

This product is made in accordance with the procedure of Example 50 using cycloheptylamide in placed of methylamine.

EXAMPLE 56

*p-Diphenethylbenzene-α,α',β,β'-tetracarboxylic acid, dimethyl ester, N,N'-di(β-phenethyl)amide*

This product is made in accordance with the procedure of Example 50 using β-phenethylamine in place of methylamine.

EXAMPLE 57

*p-Diphenethylbenzene-α,α',β,β'-tetracarboxylic acid, dimethyl ester, N,N'-diphenyl amide*

This product is made in accordance with the procedure of Example 50 using aniline in place of methylamine.

EXAMPLE 58

*p-Diphenethylbenzene-α,α',β,β'-tetracarboxylic acid, dimethyl ester, N,N'-di-pentamethylene amide*

This product is made in accordance with the procedure of Example 50 using piperidine in place of methylamine.

EXAMPLE 59

*N,N'-dicyclohexyl-p-diphenethylbenzene-α,α',β,β'-tetracarboxylic acid diamide dichloride*

About 5 grams of the diacid-diamide prepared in accordance with Example 33 is mixed with about 50 ml. of thionyl chloride in a reactor provided with an agitator and the mixture heated until the evolution of sulfur dioxide and hydrogen chloride has ceased. Removal of the excess thionyl chloride by distillation leaves the diamide-diacid/chloride.

EXAMPLE 60

*p-Diphenethylbenzene-α,α',β,β'-tetracarboxylic acid, dimethyl ester, dichloride*

About 5 grams of the diacid-diester prepared in accordance with Example 34 is mixed with about 50 ml. of thionyl chloride in a suitable reaction vessel and the mixture heated and stirred until the evolution of sulfur dioxide and hydrogen chloride has ceased. Removal of the excess thionyl chloride by distillation leaves the diester-diacid chloride.

The compounds produced in accordance with the present invention are crystalline compounds of moderate molecular weight. They are insoluble in water, but readily soluble in a variety of commercially available solvents. They are of particular value as resin intermediates, and also as (intermediates in the preparation of) plasticizers, flame proofing agents, gear oil additives, high temperature grease additives, fungicides and in numerous other industrial applications. In addition a number of the compounds under consideration exhibit bacteriostatic properties. For example, p-diphenethyl-benzene-α,α',β,β'-tetracarboxylic acid possesses inherent antibacterial activity against salmonella typhosa. These products are particularly valuable since they present a series of compounds in which the melting point can be varied while the chemical characteristics are maintained substantially constant. High melting products are obtained by using the para form of benzene diacetonitrile as the starting material, whereas the ortho and meta benzene diacetonitriles yield lower melting products.

The tetracarboxylic acids and dianhydrides of the present invention can be esterified with alcohols, such as glycerine, pentaerythritol, sorbitol, mannitol, ethylene glycol and the like in the preparation of polyester and alkyl resins having high softening points and film-forming properties. In addition, the dianhydrides are valuable in the curing of epoxy resins to increase the softening point of the resins and to render them more suitable for high temperature applications. The tetranitriles under consideration have high dielectric constants and are useful per se as insulating potting compounds, and also in combination with other materials to raise the dielectric constants of the resultant compositions. The present tetraesters and diester diamides can be used as plasticizers for polyvinyl chloride resins, imparting unusually low volatility to the resin compositions. The tetraamides and diimides of the present invention are valuable plasticizers for polyvinyl chloride resins and nitrogenous resins such as polyacrylonitriles and polyamides, and their good dielectric characteristics render them useful per se as insulators in electrical devices.

Numerous modifications and additional compounds will readily suggest themselves to those skilled in the art. Thus, while the invention has been described with particular reference to specific embodiments, it is to be understood that it is not to be limited thereto but is to be construed broadly and restricted solely by the scope of the appended claim.

The embodiments of the invention in which an exclusive property or privilege is claimed are defined as follows:

An α,α',β,β'-tetracyanodiphenethylbenzene of the formula

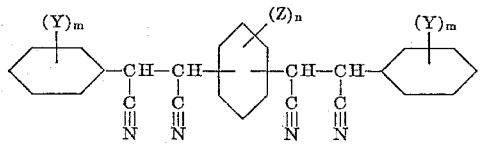

wherein
 Y is a monovalent substituent selected from the group consisting of alkyl, phenol, tolyl, phenoxy, tolyloxy and alkoxy having not more than 18 carbon atoms, nitro and halogen,
 Z is a monovalent substituent selected from the group consisting of methyl, nitro and halogen,
 m is a cardinal number from 0 to 5, inclusive, and
 n is a cardinal number from 0 to 4, inclusive.

References Cited by the Examiner
UNITED STATES PATENTS

| | | | |
|---|---|---|---|
| 1,915,334 | 6/1933 | Salzberg et al. | 260—243 |
| 2,362,614 | 11/1944 | Calva | 167—22 |
| 2,692,282 | 10/1954 | Brown | 250—557 |
| 2,803,654 | 8/1957 | Anthony et al. | 260—519 |
| 2,821,540 | 1/1958 | Specter et al. | 260—471 |
| 2,937,203 | 5/1960 | Fuller | 260—558 |
| 2,975,191 | 3/1961 | Wu | 260—326.5 |
| 2,992,236 | 7/1961 | Bavley et al. | 260—346.8 |
| 3,050,549 | 8/1962 | Gelfand | 260—475 |
| 3,180,886 | 4/1965 | Silbert et al. | 260—465 |

ALEX MAZEL, *Primary Examiner.*

NICHOLAS S. RIZZO, HENRY R. JILES, *Examiners.*

J. TOVAR, *Assistant Examiner.*